United States Patent [19]

Krallmann et al.

[11] Patent Number: 5,346,510
[45] Date of Patent: Sep. 13, 1994

[54] MIXTURES OF REACTIVE DYES

[75] Inventors: Reinhold Krallmann, Weisenheim; Regina Laws, Heppenheim; Wolfgang Schrott, Boehl-Iggelheim, all of Fed. Rep. of Germany

[73] Assignee: BASF Aktiengesellschaft, Ludwigshafen, Fed. Rep. of Germany

[21] Appl. No.: 134,908

[22] Filed: Oct. 13, 1993

[30] Foreign Application Priority Data

Oct. 14, 1992 [DE] Fed. Rep. of Germany ....... 4234621

[51] Int. Cl.$^5$ ..................... C09B 67/00; C09B 62/04
[52] U.S. Cl. ................................... 8/638; 8/639; 8/640
[58] Field of Search ................... 8/638, 639, 640

[56]  References Cited

U.S. PATENT DOCUMENTS

| | | | |
|---|---|---|---|
| 3,770,371 | 11/1973 | Bossard et al. | 8/89 |
| 3,989,692 | 11/1976 | Schreiner et al. | 540/125 |
| 3,996,221 | 12/1976 | Leng et al. | |
| 5,270,454 | 12/1993 | Hoppe et al. | 534/634 |

FOREIGN PATENT DOCUMENTS 0034287  8/1981  European Pat. Off.
0256650  2/1988  European Pat. Off.

*Primary Examiner*—Arthur C. Prescott
*Attorney, Agent, or Firm*—Oblon, Spivak, McClelland, Maier & Neustadt

[57]  ABSTRACT

Dye mixtures comprising the dye of the formula I

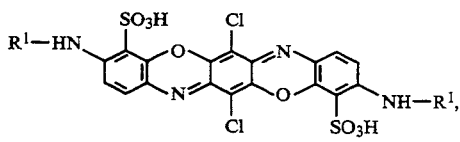

where $R^1$ is in each instance the radical of the formula

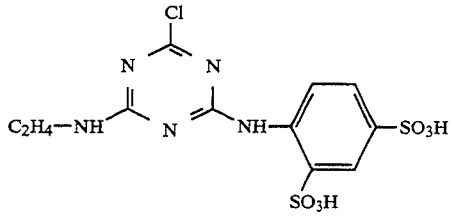

and a dye of the formula

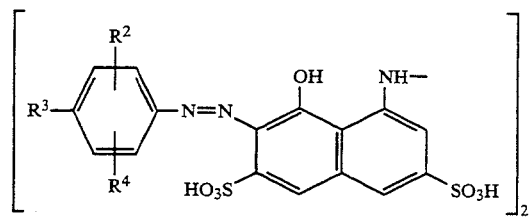

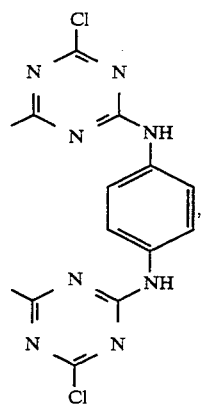

where
one of the two radicals $R^2$ and $R^3$ is methoxy and the other is hydroxysulfonyl, and
$R^4$ is hydrogen or hydroxysulfonyl, are useful for dyeing or printing hydroxyl- or nitrogen-containing organic substrates.

4 Claims, No Drawings

MIXTURES OF REACTIVE DYES

The present invention relates to novel dye mixtures comprising the dye of the formula I

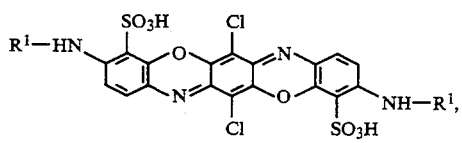

where $R^1$ is in each instance the radical of the formula

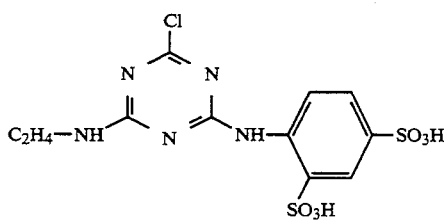

and a dye of the formula II

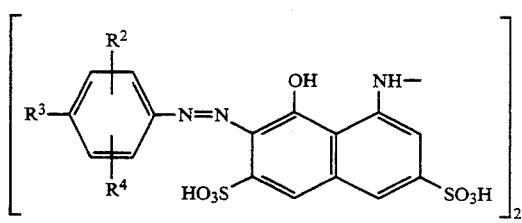

where
one of the two radicals $R^2$ and $R^3$ is methoxy and the other is hydroxysulfonyl, and
$R^4$ is hydrogen or hydroxysulfonyl, and to the use thereof for dyeing or printing hydroxyl- or nitrogen-containing organic substrates.

It is an object of the present invention to provide novel blue mixtures of reactive dyes. The novel dye mixtures shall have good in-use/service fastness properties and, in particular, high solubility. The novel mixtures shall also possess high brilliance.

We have found that this object is achieved by the dye mixtures defined at the beginning.

Preference is given to dye mixtures comprising a dye of the formula IIa

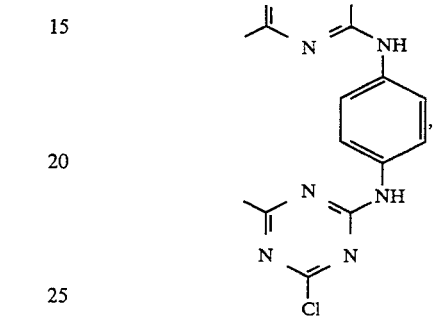

where one of the two radicals $X^1$ and $X^2$ is hydrogen and the other is hydroxysulfonyl.

Particular preference is given to dye mixtures comprising a dye of the formula IIa where $X^1$ is hydroxysulfonyl and $X^2$ is hydrogen.

The novel dye mixtures contain in general, in each case based on the total weight of the dyes, from 80 to 99% by weight, preferably from 85 to 95% by weight, of dye of the formula I and from 1 to 20% by weight, preferably from 5 to 15% by weight, of dye of the formula II.

Of particular suitability are dye mixtures comprising, in each case based on the total weight of the dyes, about 90% by weight of dye I and about 10% by weight of dye II.

The dyes of the formulae I and II are known products. The dye of the formula I is known for example from U.S. Pat. No. 3,996,221. Dyes of the formula II are described in EP-A-34 287.

The preparation of the dye mixtures of the invention is effected in a conventional manner, for example by mixing the respective dye components in the stated weight ratio. If desired, the novel mixtures may include other kinds of components, for example auxiliaries such as colorless diluents, dispersants or dust-proofing agents. It is also possible to mix ready-prepared dye preparations of respective dye components or ready-prepared dye preparations with pure dyes.

The novel dye mixtures are advantageously useful for dyeing or printing hydroxyl- or nitrogen-containing organic substrates. Examples of substrates of this kind are leather and fiber material containing chiefly natural or synthetic polyamides or natural or regenerated cellulose. The novel dyes are particularly useful for dyeing or printing textile material based on wool or in particular cotton. The dyeings obtained have brilliant blue shades.

Especially the dyeings obtained on substrates based on cellulose are strong in color and have good in-use/service fastness properties. The novel dye mixtures, which are particularly suitable for the exhaust method (dyeing temperature: about 80° C.), are readily soluble in water and exhibit a high level of brilliance. This is surprising since the dyes of the formula II are reactive dyes which in general possess only a low level of brilliance.

The invention will now be more particularly described by way of example.

The following dyes were used:

Dye 1:

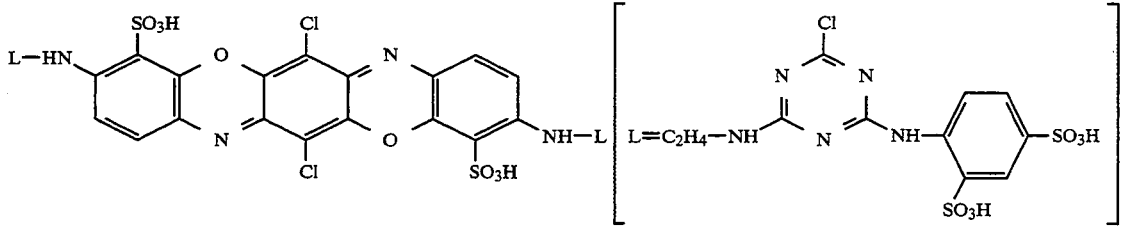

Dye 2:

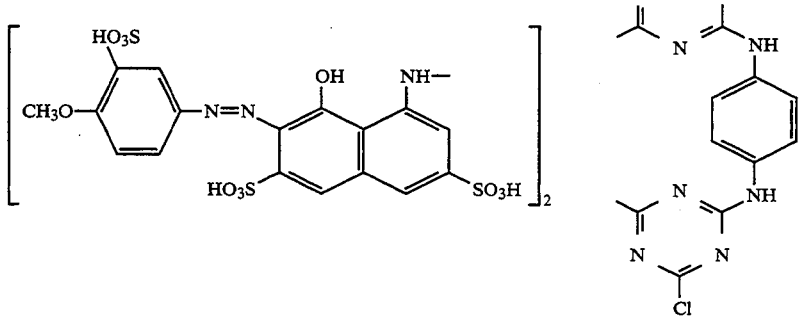

Dye 3:

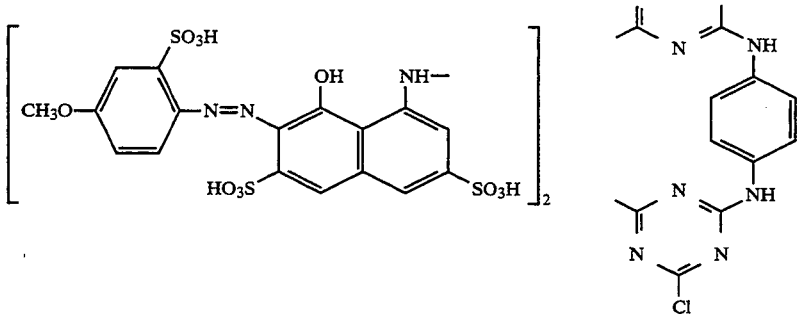

EXAMPLE 1

100 g of a cotton yarn were dyed in a bath containing 1000 ml of water, 3.5 g of a mixture of 3.2 g of dye 1 and 0.3 g of dye 2, 5 g of sodium carbonate, 1 g of 32% strength by weight sodium hydroxide solution and 50 g of sodium sulfate decahydrate. Starting at 30° C. the temperature was raised over 30 minutes to 80° C. and dyeing was continued at that temperature for a further 60 minutes. After cooling down, the yarn was rinsed and soaped off at the boil. The dyeing obtained was in a brilliant reddish blue and had excellent fastness properties.

EXAMPLE 2

100 g of woven cotton fabric were dyed in a bath containing 3000 ml of water, 4 g of a mixture of 3.5 g of dye 1 and 0.5 g of dye 3, 60 g of sodium carbonate and 150 g of sodium chloride. Starting at room temperature the temperature was raised over 30 minutes to 80° C. and dyeing was continued at that temperature for a further 60 minutes. After cooling down, the fabric was rinsed and soaped off at the boil. The dyeing obtained was in a brilliant reddish blue and had excellent fastness properties.

We claim:

1. Dye mixtures comprising the dye of the formula I

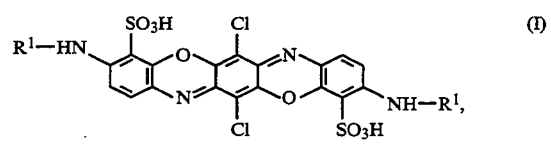

where $R^1$ is in each instance the radical of the formula

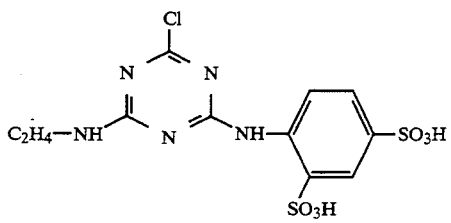

and a dye of the formula II

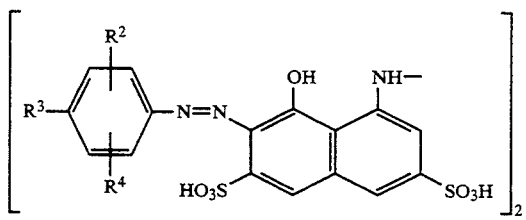

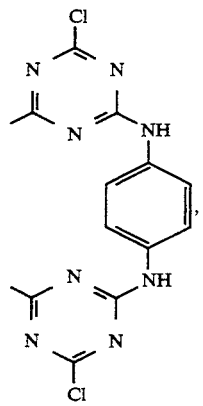

where one of the two radicals $R^2$ and $R^3$ is methoxy and the other is hydroxysulfonyl, and $R^4$ is hydrogen or hydroxysulfonyl.

2. Dye mixtures as claimed in claim 1 comprising a dye of the formula IIa

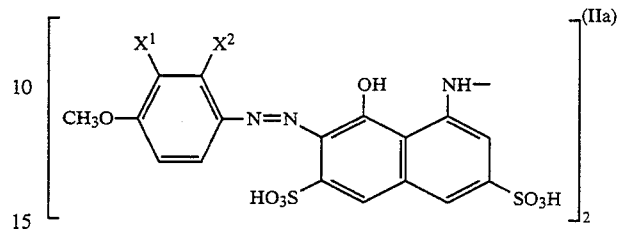

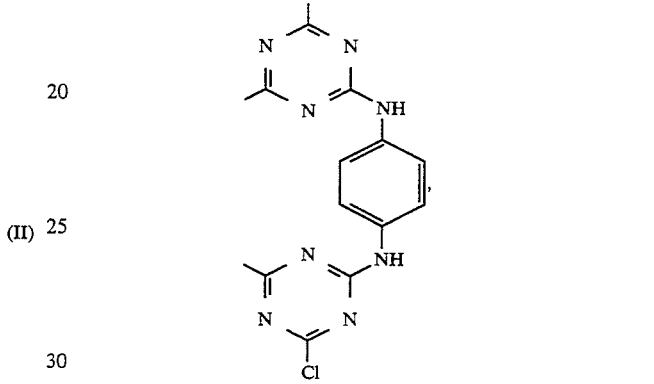

where one of the two radicals $X^1$ and $X^2$ is hydrogen and the other is hydroxysulfonyl.

3. Dye mixtures as claimed in claim 1 comprising, in each case based on the total weight of the dyes, from 80 to 99% by weight of dye of the formula I and from 1 to 20% by weight of dye of the formula II.

4. A method of dyeing comprising using the dye mixtures of claim 1 for dyeing or printing hydroxyl- or nitrogen-containing organic substrates.

* * * * *